United States Patent
Mohapatra et al.

(10) Patent No.: US 9,546,287 B2
(45) Date of Patent: Jan. 17, 2017

(54) PRINTING INK OR OVERPRINT VARNISH WITH RENEWABLE BINDER COMPONENT

(75) Inventors: Neelakamal Mohapatra, Rajasthan (IN); Pierre-Antoine Noirot, Arenthon (FR); Murielle Magrez, Mieussy (FR)

(73) Assignee: Siegwerk Druckfarben AG & Co. KGaA, Siegburg (DE)

( * ) Notice: Subject to any disclaimer, the term of this patent is extended or adjusted under 35 U.S.C. 154(b) by 400 days.

(21) Appl. No.: 14/374,153

(22) PCT Filed: Jun. 20, 2012

(86) PCT No.: PCT/EP2012/061821
§ 371 (c)(1),
(2), (4) Date: Jul. 23, 2014

(87) PCT Pub. No.: WO2013/110355
PCT Pub. Date: Aug. 1, 2013

(65) Prior Publication Data
US 2015/0000559 A1 Jan. 1, 2015

(30) Foreign Application Priority Data
Jan. 24, 2012 (IN) .............................. 212/DEL/2012

(51) Int. Cl.
| C09D 11/02 | (2014.01) |
| C09D 11/08 | (2006.01) |
| C09D 11/10 | (2014.01) |
| C09D 197/00 | (2006.01) |

(52) U.S. Cl.
CPC ............... C09D 11/08 (2013.01); C09D 11/10 (2013.01); C09D 197/005 (2013.01)

(58) Field of Classification Search
CPC ... C09D 11/037; C09D 11/02; C09D 197/005; C09D 11/102; C09D 11/033; C09D 11/10; C09D 11/08
See application file for complete search history.

(56) References Cited

U.S. PATENT DOCUMENTS

| 3,472,802 A | 10/1969 | Bownes et al. |
| 4,612,051 A | 9/1986 | Miller, Jr. et al. |
| 4,797,157 A | 1/1989 | Dilling et al. |
| 4,891,070 A | 1/1990 | Dilling et al. |
| 4,892,587 A | 1/1990 | Dilling et al. |
| 4,957,557 A | 9/1990 | Dimitri |
| 5,188,665 A | 2/1993 | Schilling |
| 5,192,361 A | 3/1993 | Schilling |
| 6,045,606 A | 4/2000 | Matzinger |

FOREIGN PATENT DOCUMENTS

| CN | 101302397 A | 11/2008 |
| EP | 1229090 | 8/2002 |
| EP | 1357141 | 10/2003 |
| EP | 1361236 | 11/2003 |
| EP | 1493762 | 1/2005 |
| EP | 1496071 | 1/2005 |
| EP | 1496072 | 1/2005 |
| EP | 1745924 | 1/2007 |
| GB | 866968 | 5/1961 |
| WO | 02/18504 | 3/2002 |
| WO | 2007/124400 | 11/2007 |

OTHER PUBLICATIONS

Leach/Pierce (Ed.), The Printing Ink Manual, Fifth Edition, Blueprint, London, pp. 33-53.
Leach/Pierce (Ed.), The Printing Ink Manual, Fifth Edition, Blueprint, London, pp. 473-598.
Jiang Tingda, "Lingnin", Chemical Industry Press, English Translation of p. 83 of D3 [4 Pages].
Chinese Office Action with English translation issued in corresponding Chinese Patent Application No. 201280067411.1 mailed May 27, 2015.

*Primary Examiner* — Veronica F Faison
(74) *Attorney, Agent, or Firm* — Davis & Bujold PLLC; Michael J. Bujold

(57) ABSTRACT

The present invention is related to a printing ink, in particular flexographic printing ink, or an overprint varnish, comprising a nitrated lignin as at least one binder component, to a process for preparing the same as well as to the use of a nitrated lignin as a binder component in a printing ink, in particular a flexographic printing ink, or an overprint varnish.

16 Claims, No Drawings

PRINTING INK OR OVERPRINT VARNISH WITH RENEWABLE BINDER COMPONENT

The present invention is related to printing inks and overprint varnishes, in particular to a flexographic ink or a gravure ink, comprising a nitrated lignin as at least one binder component.

Gravure and Flexography are the major printing processes for printing packing materials. These processes can be used for printing a large variety of substrates, such as paper, cardboard, or plastic substrates. The gravure and flexographic printing process are well-known. Reference may be made, for example, to Leach/Pierce (Eds.), The printing ink manual, Blueprint, London, 5$^{th}$ ed. 1993, p, 33-53. Also the characteristics of gravure and flexographic inks are known to the skilled man. Reference may be made, for example, to Leach/Pierce (Eds.), The printing ink manual, Blueprint, London, 5$^{th}$ ed. 1993, p, 473-598. The respective content of those chapters is incorporated herein by reference.

One main binder component for gravure and flexographic inks is nitrocellulose. However, nitrocellulose has become increasingly expensive in recent years, making its use in printing inks economically less attractive. While several synthetic binder components for gravure and flexographic inks are known, for environmental reasons it would be desirable to use at least as a portion of the binder component a renewable material. Since packaging materials frequently undergo thermal treatment for e.g. sealing, pasteurisation or sterilization purposes after their manufacture, such binder material would also have to show good thermal resistance in order to be suitable as a component in gravure and flexographic inks.

Lignin is a biopolymer occurring in wood. It consists of phenolic macromolecules with varying structure. Industrially, it is obtained as a by-product of the paper-making process. By the known Kraft process (sulphate process) and/or the sulfite process, alkaline lignin or ligninsulfonates may be obtained. These processes as well as the lignin products obtained thereby are well-known in the art and do not have to be discussed here in detail.

During the last two decades alkaline lignin from the Kraft process has been used as such in some applications including as tackifiers and antioxidants for rubber compounds, wood composites by replacing a part of phenolic resins with lignins in a phenol-formaldehyde resin formulation, or degradable plastic polymeric blends. Lignin derivatives such as sulfomethylolated lignins have been used in specific compositions for reducing the water content of a concrete mixture. Ligno-phenol derivatives are used in moulded resin compositions. In WO 02/18504 A2, the use of sulfonated and/or sulfomethylated lignins as a dispersing agent in aqueous dye preparations for ink jet printing is described.

There have been disclosures on the use of lignins from the above Kraft or Sulfite process as binder component in printing inks. Reference is made to the following patents from Westvaco Corp.: U.S. Pat. Nos. 5,192,361; 5,188,665; 4,957,557; 4,891,070; 6,045,606; 4,892,587; 4,612,051. It has to be noted, however, that those old patents have never matured into a commercial printing ink comprising lignin as a binder component. Apparently, those formulations did not show sufficient properties for being an alternative to nitrocellulose as binder component in gravure and flexographic inks.

It was the problem of the present invention to provide a printing ink, in particular a gravure printing ink or a flexographic printing ink, as well as an overprint varnish, comprising a binder component which at least in part consists of a renewable material having sufficient heat resistance.

According to the present invention, the above problem has been surprisingly solved by a printing ink, in particular a gravure printing ink or a flexographic printing ink, comprising a nitrated lignin as at least one binder component.

According to the present invention, the above problem has also been solved by an overprint varnish, comprising a nitrated lignin as at least one binder component.

According to the present invention, the term "nitrated lignin" defines a product which is obtained by nitration of lignin.

In particular, a nitrated lignin according to the present invention is obtained from alkaline lignin which is the product of the above described Kraft process. Basically, in the Kraft process lignin-containing biomaterial is treated with mineral acids without the application of heat.

According to the present invention, it is particularly preferred to use an alkaline lignin which has been prepared according to the method described in WO 2007/12440 A2 (Greenvalue S.A.). The content of WO 2007/12440 A2 is incorporated herein by reference. Basically, lignin from e.g. the above described Kraft process is subjected to a chemo-thermomechanical treatment involving mechanical shear at a maximum temperature of about 100-220° C. and a pressure of about 0,5 to 10 atmospheres in the presence of an additive such as a glycol which lowers the softening point of the lignin. Such alkaline lignins are commercially available as a dry powder under the trade name Protobind sold by ALM India.

An exemplary lignin suitable for preparing the nitrated lignins of the present invention is sold under the commercial name Protobind 2000. It is essentially sulphur-free (less than 10%), has a softening temperature of about 130° C., has a number-average molecular weight of about 1000 g/mol, and is insoluble in an aqueous medium having a pH of 7 or less. However, it is highly soluble in an aqueous medium having a pH higher than 7. This is a big difference to conventional lignins, which are generally poorly soluble. The water solubility of the commercial products of the Protobind series varies.

According to the present invention, the nitrated lignin is preferably obtained there from by a nitration process described in GB-866,968: The lignin is suspended in a water-immiscible organic liquid which is inert to nitric acid, such as carbon tetrachloride ($CCl_4$), carbon disulphide ($CS_2$) or methylene dichloride ($CH_2Cl_2$), and subsequently reacted with nitric acid ($HNO_3$) at a temperature not exceeding 28° C. in order to avoid oxidative degradation. Nitric acid is not used in excess. The content of GB-866,968 is incorporated herein by reference.

It should be noted that the present invention is not limited to nitrated lignins which are obtained by the above method. Other methods for preparing nitrated lignins may also be applied. For example, nitration may also be carried out with a mixture of concentrated sulphuric acid ($H2SO_4$) and concentrated nitric acid under cooling and stirring in an organic solvent. According to the present invention, any method for nitrating lignin is suitable which does not lead to an undesirable degree of oxidative degradation and which yields to a soluble nitrated lignin.

The nitrated lignins are soluble in a variety of solvents, such as acetone, methyl ethyl ketone, ethanol, or isopropanol. According to a preferred embodiment of the present invention, it has been found that favourable solubility characteristics can be maintained if the nitrated lignin is not stored in isolated form, but in a 50% solution acetone.

The nitrated lignins of the present invention may vary in their degree of nitration and in their molecular weight.

For various applications it is preferred to use the nitrated lignin component together with other binders. It has been found that the nitrated lignins of the present invention show a sufficient or good compatibility with many polyurethane resins, ketonic resins or polyamide resins. Thus, the nitrated lignins of the present invention can be advantageously used in combination. Examples of compatible resins are the the polyurethane resins of the applicant, described for example in EP-1 229 090 A1, EP-1 357 141 A1, EP-1 361 236 A1, EP-1 493 762 A1, EP-1 496 072 A1, or EP-1 496 071 A1.

The ratio of nitrated lignin component of other binder components to be used depends upon the ink properties to be achieved and can be accordingly readily established by a skilled person. The ratio may be limited by compatibility of the nitrated lignin component to other binder components.

The nitrated lignins may be used in the printing inks of the present invention as a pigment binder, in particular for cyan pigments, or alternatively as a binder in a varnish, such as an over-print varnish.

Depending on whether the ink of the present invention is used as a colored ink layer or as a varnish, a colorant may be present. According to the present invention, the colorant is preferably a pigment. According to the present invention any pigment which is typically used in flexographic inks such as monoazo yellows (e. g. CI Pigment Yellows 3,5,98); diarylide yellows (e. g. CI Pigment Yellows 12,13,14); Irgalite Blue, Pyrazolone Orange, Permanent Red 2G, Lithol Rubine 4B, Rubine 2B, Red Lake C, Lithol Red, Permanent Red R, Phthalocyanine Green, Phthalocyanine Blue, Permanent Violet, titanium dioxide, carbon black, etc, may be used.

The pigment is typically employed in amounts of from 5 to 60 wt.-%, preferably 10 to 60 wt.-%, based on the weight of the ink composition.

According to the present invention, the amounts given for the individual components of a printing ink or an overprint varnish are understood such that the combination of all components sums up to 100 wt.-%

The pigment is combined with the binder material by any convenient method. According to the present invention, the pigment is provided in form of a dispersion in the nitrated lignin. Dispersion of the pigment in the nitrated lignin can be carried out, for example, by milling methods. Examples are ball mill, sand mill, horizontal media mill, high-shear fluid flow mill, or the like. A typical pigment dispersion according to the present invention comprises a solution of the nitrated lignin in solvents such as ethanol, ethyl acetate, N-propyl acetate or mixtures thereof, in combination with the pigment and optionally additional solvents (which may be the same as for the solution of the nitrated lignin.

The printing inks an overprint varnishes according to the present invention typically comprise 10 to 80 wt.-%, preferably 40 to 80 wt.-% of a binder material, based on the weight of the ink composition. This may be the nitrated lignin alone or a combination of nitrated lignin with one of the other binders mentioned above.

Optionally, a solvent and additives such as fillers, surfactants, varnishes, wax, adhesion promoters and the like may be added depending upon the specific requirements imposed on the printing ink or the overprint varnish.

According to a preferred embodiment of the present invention, the printing ink or overprint varnish comprises 1 to 10 wt.-% of one or more additives, based on the weight of the ink composition.

As additional solvent components forming the balance of the printing ink or overprint varnish, alcohols such as ethanol, n-propanol or ethoxypropanol, or esters such as ethyl acetate or n-propyl acetate may be used.

The printing inks or overprint varnishes of the present invention may be prepared like conventional flexographic inks or overprint varnishes, respectively, by mixing the individual components with each other under appropriate conditions.

As mentioned above, according to a preferred embodiment of the present invention the nitrated lignin component is provided as a 50% solution in acetone, in order to maintain good solubility. Thus, the present invention is also related to a process for preparing a printing ink or overprint varnish, in particular a gravure printing ink or flexographic printing ink, comprising the steps of:

Preparing a nitrated lignin by nitrating alkaline lignin and dissolving said nitrated lignin in acetone to obtain a 50% solution in acetone Mixing the solution of nitrated lignin in acetone with one or more components selected from the group consisting of a colorant, preferably a pigment, at least one solvent, and optional additives.

As described above, the nitration of alkaline lignin is preferably carried out by a nitration process described in GB-866,968: The lignin is suspended in a water-immiscible organic liquid which is inert to nitric acid, such as carbon tetrachloride, carbon disulphide or methylene dichloride, and subsequently reacted with nitric acid at a temperature not exceeding 28° C. in order to avoid oxidative degradation. Nitric acid is not used in excess. According to the present invention, preferably $CCl_4$ is used as solvent. The reaction is preferably conducted for 2 to h, most preferably for 4 to 8 h.

According to a preferred embodiment of the present invention, the thus obtained nitrated lignin is washed with water and with $CCl_4$. It has been found that by washing the product with those different solvents, more impurities can be removed from the nitrated lignin.

As described above, the alkaline lignin to be preferably used in the process of the present invention is the product of the above described Kraft process. According to the present invention, it is particularly preferred to use an alkaline lignin which has been prepared according to the method described in WO 2007/12440 A2 (Greenvalue S.A.). The content of WO 2007/12440 A2 is incorporated herein by reference. Such alkaline lignins are commercially available as a dry powder under the trade name Protobind sold by ALM India. An exemplary lignin suitable for preparing the nitrated lignins of the present invention is sold under the commercial name Protobind 2000. Reference is made to the detailed description above.

According to the present invention, it has been surprisingly found that the above described nitrated lignins can be used as binders in printing inks or overprint varnishes, in particular in gravure printing inks or flexographic printing inks. As described above, the nitrated lignin may be the sole binder component or may be used in combination with other resins which are compatible with nitrated lignin.

According to the present invention, it has been found that nitrated lignin is compatible with some of the conventional binders used in flexographic inks, such as many polyurethane resins, ketonic resins or polyamide resins.

Quite surprisingly, the printing inks and overprint varnishes of the present invention show an improved heat resistance as compared to conventional inks or overprint varnishes on the basis of a nitrocellulose binder material.

Thus, the printing inks or overprint varnishes of the present invention possess the following advantages over inks or overprint varnishes on the basis of a conventional nitrocellulose binder:

- They are cheaper, since nitrated lignin is available from cheap and commonly available alkaline lignin
- They are more heat resistant, making them more suitable for applications where the printed product is subjected to a heat treatment, e.g. for sterilization.

The present invention will now be further explained using non-limiting examples.

EXAMPLE 1

Synthesis of Nitrated Lignin

Nitrated lignin was prepared according to the method described in the example of GB-866,968. 50 gram of lignin was dispersed in 250 ml of carbon tetrachloride ($CCl_4$). The dispersion was cooled with water, while a mixture of 40 ml of concentrated nitric acid and 125 ml of $CCl_4$ was carefully added in small portions under constant stirring into a double layered reactor vessel. In order to avoid any oxidative degradation, the temperature was not allowed to rise beyond 28° C. After 6 hours the products were filtered and washed with water followed by $CCl_4$ to remove acid and impurities and dried under vacuum. It should be noted that in the example of GB-866,968, the reaction was only conducted for 2 hours. In order to ensure complete nitration, the reaction time was prolonged. Also, in the example of GB-866,968, the reaction product was only washed with $CCl_4$. This was not found sufficient for obtaining a pure product. Thus, an additional step of washing the product with water was included. During washing with water, it was seen that some portions of the product were soluble in water.

The nitrated lignin was found to be soluble in acetone and partially soluble in alcohol. However, after keeping the solid nitrated lignin for several days, the acetone solubility had decreased. So in order to keep the solubility of the nitrated lignin constant, a 50% acetone solution of the nitrated lignin was prepared. This solution was used throughout the ink following examples.

EXAMPLE 2

Over-print Varnish with Nitrated Lignin

An over-print varnish was prepared as follows: 54,6 wt.-% of nitrated lignin according to example 1 (as a 50% solution acetone) was mixed with 24,4 wt.-% ethanol, 6 wt.-% ethyl acetate and 15 wt.-% n-propyl acetate. 77 wt.-% of the resulting nitro lignin solution were mixed with 7,7 wt.-% of a polyurethane resin (Surkopak 5244), 4,6 wt.-% ethanol, 7,8 wt.-% ethoxy propanol, 1,4 wt.-% of wax (Luwax AF-31 from BASF, a micronized polyethylene wax), and 1 wt.-% of an adhesion promoter (Vertec PI-2 from Johnson Mathey; this is a titanate coupling agent (Ethoxy isopropoxy titanium bis(2, 4-pentanedionate)).

COMPARATIVE EXAMPLE 1

Over-print Varnish with Nitrocellulose

For comparison, an over-print varnish was prepared as described in example 2 with the exception that instead of 77,5 wt.-% of the nitro lignin solution, 77,5 wt.-% of a solution consisting of 39 wt.-% nitrocellulose (SS ⅛, IPA damped) 40 wt.-% ethanol, 6 wt.-% ethyl acetate and 15 wt.-% n-propyl acetate was used.

EXAMPLE 3

Heat Resistance Test

Aluminium foil was used as a substrate. On said substrate, a conventional ink formulation (Access-Foil from Siegwerk) was applied.

Onto the conventional ink layer, alternatively the over-print varnish from example 2 and the over-print varnish from comparative example 1 were printed. The resulting product was heat treated. The product comprising the over-print varnish from comparative example 1 was found to be stable up to 200° C. However, product comprising the over-print varnish from example 2 was found to be stable up to 250° C. Thus, the over-print varnish on the basis of a nitrated lignin was much more heat resistant than a conventional over-print varnish on the basis of nitrocellulose as main binder component.

The invention claimed is:

1. Printing ink, comprising a nitrated lignin as at least one binder component.
2. Printing ink according to claim 1, wherein the nitrated lignin is obtained by nitration of alkaline lignin with nitric acid at a temperature not exceeding 28° C. in the presence of a solvent which is immiscible with water and inert to nitric acid.
3. Printing ink according to claim 2, wherein the alkaline lignin is obtained by subjecting lignin to a chemo-thermo-mechanical treatment involving mechanical shear at a maximum temperature of about 100-220° C. and a pressure of about 0,5 to 10 atmospheres in the presence of an additive which lowers the softening point of the lignin.
4. Printing ink according to claim 1, wherein the ink comprises at least one additional binder selected from the group consisting of polyurethane resins, ketonic resins or polyamide resins.
5. Printing ink according to claim 1, wherein the ink additionally comprises a colorant.
6. Printing ink according to claim 1, wherein the ink additionally comprises a solvent and optionally additives.
7. Overprint varnish, comprising a nitrated lignin as at least one binder component.
8. Overprint varnish according to claim 7, wherein the nitrated lignin is obtained by nitration of alkaline lignin with nitric acid at a temperature not exceeding 28° C. in the presence of a solvent which is immiscible with water and inert to nitric acid.
9. Overprint varnish according to claim 8, wherein the alkaline lignin is obtained by subjecting lignin to a chemo-thermomechanical treatment involving mechanical shear at a maximum temperature of about 100-220° C. and a pressure of about 0,5 to 10 atmospheres in the presence of an additive which lowers the softening point of the lignin.
10. Overprint varnish according to claim 7, wherein the ink comprises at least one additional binder selected from the group consisting of polyurethane resins, ketonic resins or polyamide resins.
11. Overprint varnish according to claim 7, wherein the ink additionally comprises a solvent and optionally additives.
12. Process for preparing a printing ink or an overprint varnish, comprising the steps of:

preparing a nitrated lignin by nitrating alkaline lignin and dissolving said nitrated lignin in acetone to obtain a 50% solution in acetone mixing the solution of nitrated lignin in acetone with one or more components selected from the group consisting of a colorant, at least one solvent, and optional additives.

13. Process according to claim 12, wherein the nitrated lignin is prepared by suspending alkaline lignin in a water-immiscible organic liquid which is inert to nitric acid, and reacting the lignin with nitric acid at a temperature not exceeding 28° C. for 2 to 8 h.

14. Process according to claim 12, wherein after completion of the reaction the nitrated lignin is washed with water and with CC14.

15. Method of use of a nitrated lignin for preparing a printing ink according to claim 1, comprising a step of applying said printing ink or overprint varnish onto a substrate.

16. Method of use of a nitrated lignin for preparing an over-print varnish according to claim 7, comprising a step of applying said printing ink or overprint varnish onto a substrate.

* * * * *